(12) United States Patent
Colarelli, III et al.

(10) Patent No.: US 6,386,031 B2
(45) Date of Patent: May 14, 2002

(54) WHEEL BALANCER WITH SPEED SETTING

(75) Inventors: Nicholas J. Colarelli, III, Creve Coeur; Michael W. Douglas, St. Peters; Paul Daniel Parker, Kirkwood, all of MO (US)

(73) Assignee: Hunter Engineering Company, Bridgeton, MO (US)

(*) Notice: Subject to any disclaimer, the term of this patent is extended or adjusted under 35 U.S.C. 154(b) by 0 days.

(21) Appl. No.: 09/797,348

(22) Filed: Mar. 1, 2001

Related U.S. Application Data

(60) Division of application No. 09/311,472, filed on May 13, 1999, which is a continuation-in-part of application No. 08/706,742, filed on Sep. 9, 1996, now abandoned, which is a continuation-in-part of application No. 08/594,756, filed on Jan. 31, 1996, now abandoned.

(51) Int. Cl.[7] .................................................. G01M 1/22
(52) U.S. Cl. ........................................... 73/462; 73/460
(58) Field of Search .......................... 73/460, 462, 468, 73/146, 865.8; 157/13, 14, 17, 20, 21

(56) References Cited

U.S. PATENT DOCUMENTS

| | | | | |
|---|---|---|---|---|
| 3,630,077 A | * | 12/1971 | Boileau | 73/146 |
| 4,139,041 A | * | 2/1979 | Newton | 157/13 |
| 4,244,416 A | * | 1/1981 | Newton | 157/13 |
| 5,105,595 A | * | 4/1992 | Dale et al. | 51/165.71 |
| 5,396,436 A | | 3/1995 | Parker et al. | 73/462 |
| 5,739,428 A | * | 4/1998 | Bux | 73/146 |

FOREIGN PATENT DOCUMENTS

WO PCT/US87/03141 * 11/1987

* cited by examiner

Primary Examiner—Helen Kwok
(74) Attorney, Agent, or Firm—Thompson Coburn LLP

(57) ABSTRACT

A wheel balancer is provided that includes a shaft adapted for receiving a wheel/tire assembly, the shaft having a longitudinal axis and being rotatable about the axis so as to rotate a wheel/tire assembly removably mounted thereon, a rotation sensor for measuring rotation of the shaft about its longitudinal axis and a vibration sensor operatively connected to the shaft for measuring vibrations resulting from imbalance in the wheel/tire assembly. A motor operatively connected to the shaft for rotating the shaft about its longitudinal axis to rotate the wheel/tire assembly is also included. The wheel balancer further includes a control circuit for controlling the application of current to the motor to rotate the wheel/tire assembly at a plurality of sustainable speeds. The control circuit may also be adapted for determining from vibrations measured by the vibration sensor at least one weight placement position on the wheel/tire assembly to correct the vibrations. In that embodiment, a manually operable input device is included to set a desired speed of rotation of the wheel/tire assembly, the control circuit being responsive to the input device to cause the motor to rotate the wheel/tire assembly at the desired speed, whereby a user can input a desired speed and balancer tests the wheel/tire assembly at that speed.

16 Claims, 8 Drawing Sheets

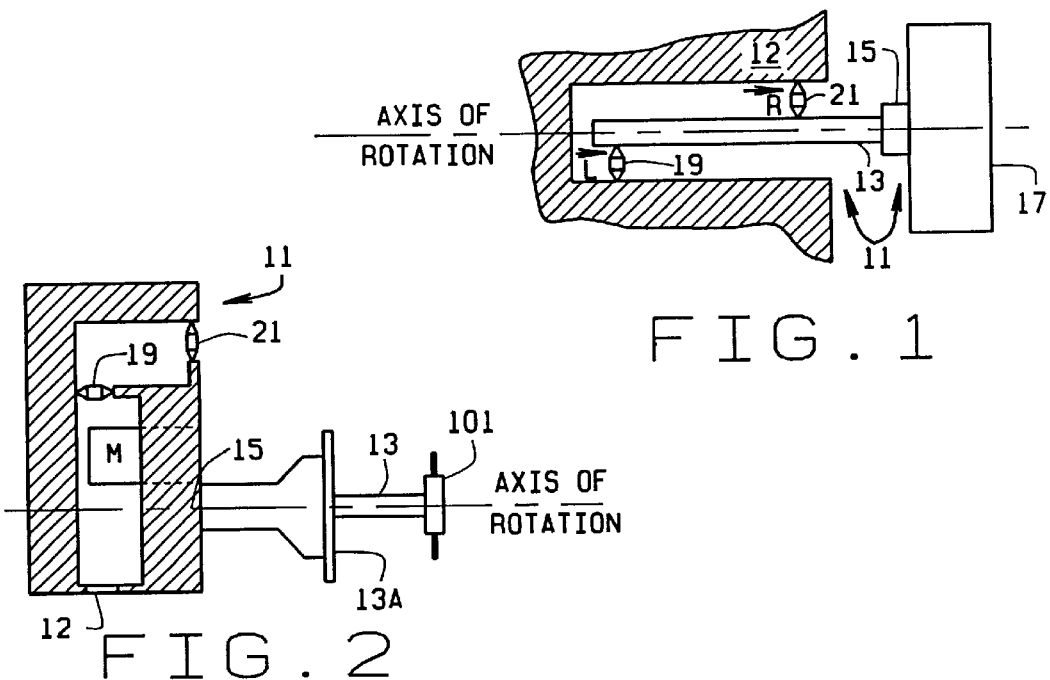
FIG. 1
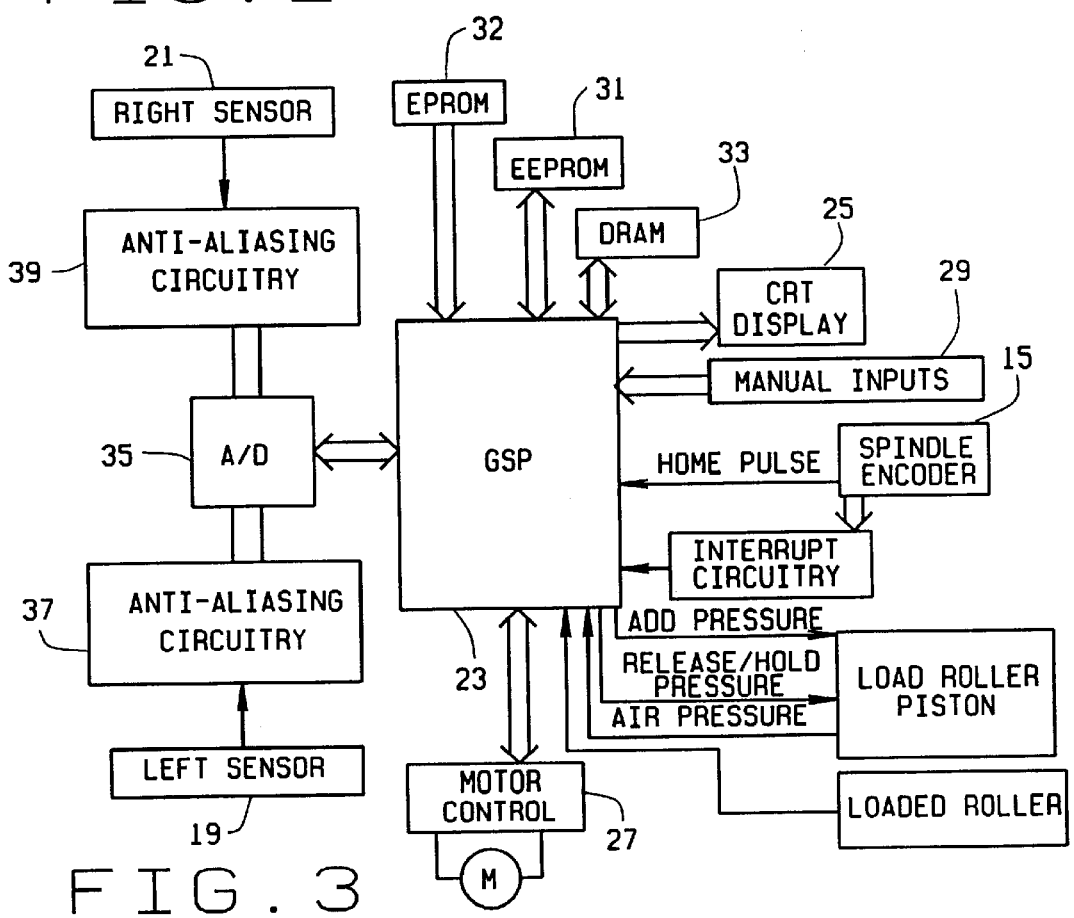
FIG. 2
FIG. 3

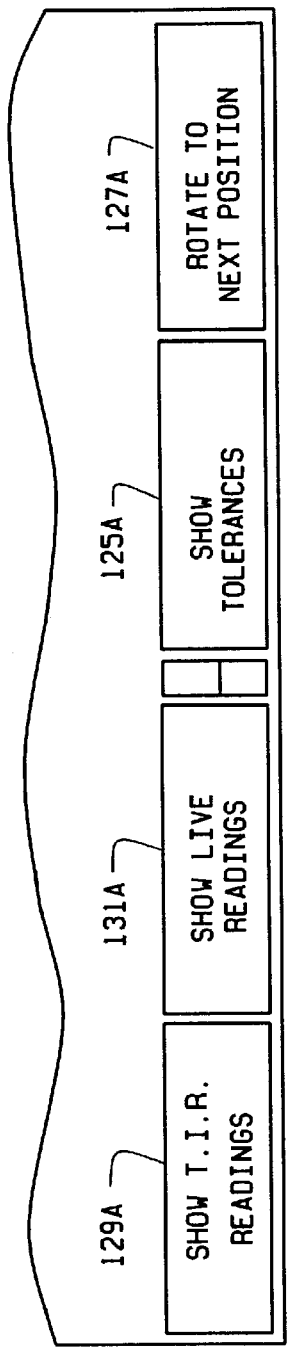
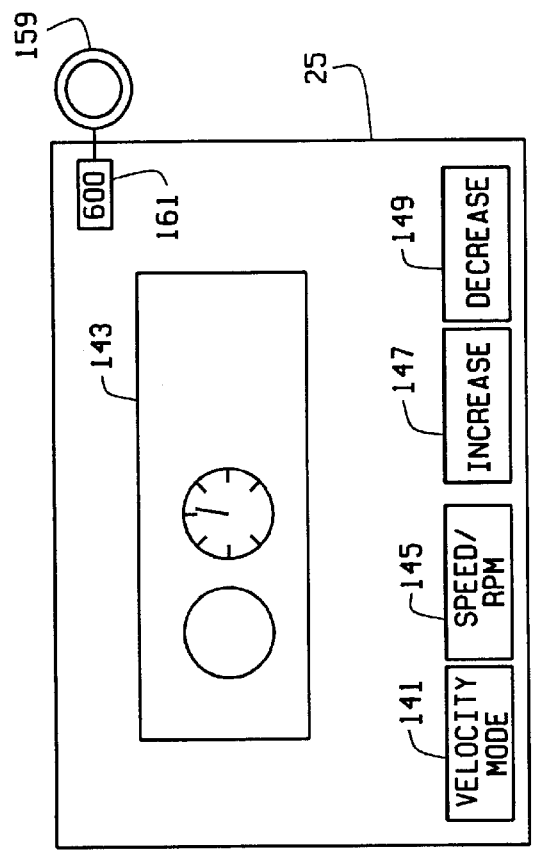

WHEEL BALANCER WITH SPEED SETTING

CROSS-REFERENCE TO RELATED APPLICATIONS

This is a divisional of U.S. application Ser. No. 09/311,472, filed May 13, 1999, which is a continuation-in-part of U.S. application Ser. No. 08/706,742, filed Sep. 9, 1996 now abandoned, which is a continuation-in-part of U.S. application Ser. No. 08/594,756, filed Jan. 31, 1996, now abandoned.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to wheel balancers and in particular to wheel balancers with speed settings.

The determination of unbalance in vehicle wheels is carried out by an analysis with reference to phase and amplitude of the mechanical vibrations caused by rotating unbalanced masses in the wheel. The mechanical vibrations are measured as motions, forces, or pressures by means of transducers, which convert the mechanical vibrations to electrical signals. Each signal is the combination of fundamental oscillations caused by imbalance and noise.

It is believed that the drive systems for currently available balancers could be improved to aid in operation. For example, prior art balancers typically require the operator to manually rotate the wheel/tire assembly to the desired position for weight placement and/or runout correction. These balancers then use a manual brake or the motor itself to temporarily hold the shaft in the desired position. However, such a system could be improved. Manual rotation to the desired position is less than satisfactory since it requires the operator to interpret the balancer display correctly. Moreover, manual rotation itself is not desirable, since it ties up the operator's time and attention. In conventional systems, however, the balancer motor cannot be used to rotate the wheel/tire assembly to the correct position since available motor controllers used in balancers are incapable of performing this function.

Using the motor itself to provide a braking action is not completely satisfactory either. Such braking is normally accomplished by applying rectified alternating current to an AC motor. This method is inherently subject to error. The actual stopping position may be incorrect if the tire is larger than average or turning too fast for the "brake" to respond. Moreover, although currently available motor braking systems stop the wheel in approximately the correct position, they do not actually hold the tire in position since the motor would heat up if the "brake" was left on. With conventional equipment, a wheel/tire assembly with sufficient static imbalance to overcome its own inertia, therefore, can roll away from the braked dynamic weight position as soon as the braking energy is released. In addition, electrical braking systems are usually of little use when power is removed from the circuit, as could occur should a power failure take place.

Currently available balancers could also be improved in another way. Presently, the balancer shaft position is sensed and the resulting signal is supplied to the control circuit. The control circuit typically analyzes the signal using software to determine if certain conditions (excessive rpm, excessive acceleration, etc.) exist. These systems are not foolproof, and could be improved.

Even when a wheel/tire assembly is balanced, non-uniformity in the construction of the tire as well as runout in the rim can cause significant vibration forces as the wheel rolls under vehicle load. Most tire manufacturers inspect their tires on tire uniformity machines and grind rubber off the tires as required to improve rolling characteristics of the tires. Even after this procedure, tires will often produce vibration forces (not related to imbalance) of 20 pounds as they roll on a smooth road. To put this in perspective of balancing, a 0.8 ounce balance weight is required to produce a 20 pound vibration force on a typical wheel traveling at 70 mph.

Prior art balancers are also not well equipped to take into account and correct for variations in uniformity of the wheel rim and the tire. It would be desirable, for example, to place a measured amount of imbalance in a wheel to counter tire non-uniformity forces or to detect and mark the position on a tire which should be matched to a corresponding position on the rim to reduce vibration due to non-uniformity of either or both. To the extent that presently available balancers do measure rim and tire runout, it is believed that the information they acquire is not particularly useful to the operator. In particular, presently available balancers which do measure runout generally display that runout to the user in the form of sine waves referenced to some arbitrary point. For a conventional system, which typically measures radial runout of both rims, this results in two (basically incomprehensible) sine waves. Such a system could be improved.

SUMMARY OF THE INVENTION

Among the various objects and features of the present invention is a wheel balancer with improved performance.

Another object is the provision of such a wheel balancer with an improved drive circuit.

A third object is the provision of such a wheel balancer with an improved display.

Other objects and features will be in part apparent and in part pointed out hereinafter.

Briefly, in a first aspect of the present invention, a wheel balancer includes a shaft adapted for receiving a wheel/tire assembly, the shaft having a longitudinal axis and being rotatable about the axis so as to rotate a wheel/tire assembly removably mounted thereon, a rotation sensor for measuring rotation of the shaft about its longitudinal axis, a vibration sensor operatively connected to the shaft for measuring vibrations resulting from imbalance in the wheel/tire assembly, a motor operatively connected to the shaft for rotating the shaft about its longitudinal axis, thereby rotating the wheel/tire assembly, and a control circuit for controlling the application of current to the motor to rotate the wheel/tire assembly at a plurality of sustainable speeds.

In a second aspect of the present invention, a wheel balancer includes a shaft adapted for receiving a wheel/tire assembly, the shaft having a longitudinal axis and being rotatable about the axis so as to rotate a wheel/tire assembly removably mounted thereon, a rotation sensor for measuring rotation of the shaft about its longitudinal axis, a vibration sensor operatively connected to the shaft for measuring vibrations resulting from imbalance in the wheel/tire assembly, a motor operatively connected to the shaft for rotating the shaft about its longitudinal axis, thereby rotating the wheel/tire assembly and a control circuit. The control circuit controls the application of current to the motor and determines, from vibrations measured by the vibration sensor, at least one weight placement position on the wheel/tire assembly to correct the vibrations. A manually operated input devices is also included to set a desired speed of rotation of the wheel/tire assembly, the control circuit being responsive to the input device to cause the motor to rotate the wheel/tire assembly at the desired speed, whereby a user can input a desired speed and balancer tests the wheel/tire assembly at that speed.

BRIEF DESCRIPTION OF THE DRAWINGS

FIG. 1 is a diagrammatic view illustrating a generic wheel balancer suitable for use with the present invention;

FIG. 2 is a simplified top plan view illustrating the preferred embodiment of the wheel balancer of the present invention;

FIG. 3 is a block diagram illustrating electrical circuitry of the wheel balancer of FIG. 1 or FIG. 2;

FIGS. 10 and 10A illustrate various displays used in the present invention; and

FIG. 11 illustrates an additional speed setting display used in the present invention.

Similar reference characters indicate similar parts throughout the several views of the drawings.

DESCRIPTION OF THE PREFERRED EMBODIMENT

Figure 4:
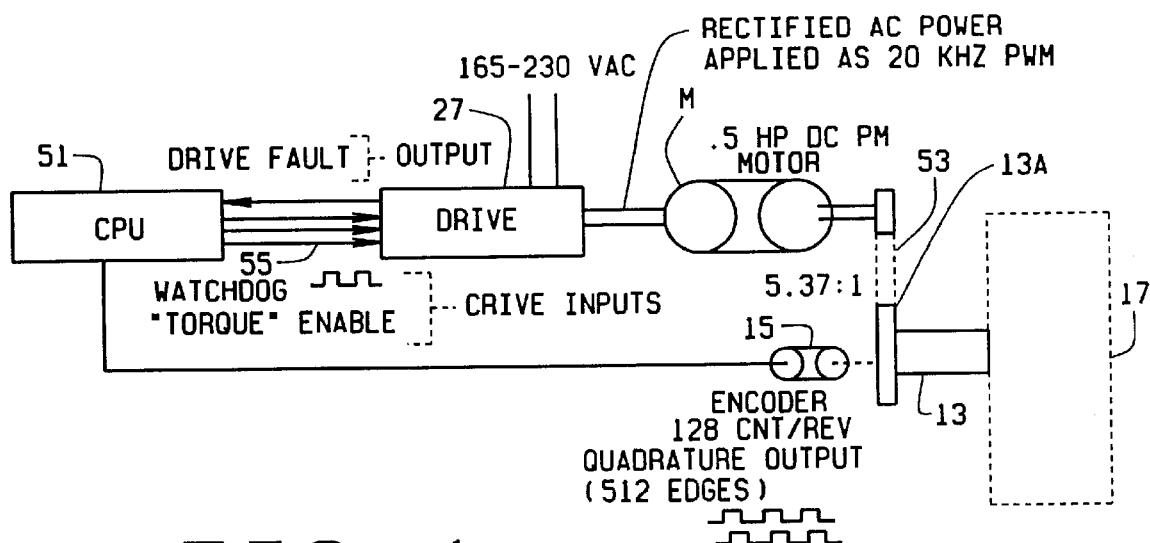
FIG. 4 is a simplified schematic of the electronic control circuitry of the balancer of the present invention.

Turning to the drawings, FIG. 1 illustrates (in simplified form) the mechanical aspects of a wheel balancer 11 suitable for the present invention. Balancer 11 includes a rotatable shaft or spindle 13 driven by a suitable drive mechanism such as a direct current 0.5 horsepower electric motor M and drive belt 53 (FIG. 2). Mounted on spindle 13 is a conventional quadrature phase optical shaft encoder 15 which provides speed and rotational position information to the circuitry of FIG. 3.

During the operation of wheel balancing, at the end of spindle 13, a wheel/tire assembly 17 under test is removably mounted for rotation with spindle hub 13A (FIG. 2). To determine wheel/tire assembly imbalance, the balancer includes at least a pair of piezoelectric type imbalance force sensors 19 and 21 (or other suitable sensors such as strain gauges) coupled to spindle 13 and mounted on the balancer base 12. For ease of reference herein, sensor 19 is referred to as the "L" (Left) sensor and sensor 21 is referred to as the "R" (Right) sensor.

Turning to FIG. 2, it can be seen that the actual construction of the mechanical aspects of balancer 11 can take a variety of forms. For example, spindle 13 can include a hub 13A against which wheel/tire assembly 17 abuts during the balancing procedure. Moreover, sensor "L," sensor "R," and sensor 22 need not directly abut spindle 13. For example, various arms or rods as shown in FIG. 2 can be used to mechanically couple the sensors to the spindle so that they are exposed to the vibrations and/or forces of the spindle.

When wheel/tire assembly 17 is unbalanced, it vibrates in a periodic manner as it is rotated, and these vibrations are transmitted to spindle 13. The "L" and "R" sensors are responsive to these vibrations of the spindle. Specifically, they generate a pair of analog electrical signals corresponding in phase and magnitude to the vibrations of the spindle at the particular transducer locations. These analog signals are input to the circuitry of FIG. 3, described below, which determines the required magnitudes and positions of correction weights to correct the imbalance.

Turning to FIG. 3, wheel balancer 11 includes not only the "L" and "R" sensors, and spindle encoder 15, but also a graphic signal processing (GSP) chip 23. Preferably GSP chip 23 is a Texas Instruments model TMS34010 chip. GSP chip 23 performs signal processing on the output signals from the "L" and "R" sensors to determine wheel imbalance. In addition it is connected to and controls a display 25 which provides information to the user, controls motor M through motor control circuitry 27 described in more detail below, and keeps track of the spindle position from encoder 15. More specifically, encoder 15 is a 128 count, two channel quadrature encoder, which is fully decoded to 512 counts per wheel revolution by GSP chip 23. Although GSP chip 23 is preferred, it should be understood that other controller circuitry could be used as well.

Balancer 11 also includes manual inputs 29 (such as a keyboard and parameter input data dials) which are also connected to GSP chip 23. Chip 23 has sufficient capacity to control via software all the operations of the balancer in addition to controlling the display. The GSP chip is connected to EEPROM memory 31, EPROM program memory 32, and dynamic RAM (DRAM) memory 33. The EEPROM memory is used to store non-volatile information, such as calibration data, while the GSP chip uses DRAM 33 (as discussed below) for storing temporary data.

GSP chip 23 is also connected to an ADC 35, which is preferably an Analog Devices AD7871 type device or any other appropriate chip. ADC 35 is a fourteen (14) bit A/D converter with an on-board voltage reference.

The signals from the "L" and "R" sensors 19 and 21 are supplied through anti-aliasing circuitry 37, 39 to ADC 35. More specifically, the signals are each fed through unity gain buffers (not shown but well known in the art) to anti-aliasing filters making up part of circuitry 37, 39. Sallen/Key type low pass Butterworth filters function well for this purpose.

The operation of the various components described above is fully described in U.S. Pat. Nos. 5,365,786 and 5,396,436, the disclosures of which are incorporated herein by reference. It should be understood that the above description is included for completeness only, and that various other circuits could be used instead. The GSP chip could be replaced by a general purpose microcontroller, for example, with no loss of efficiency in carrying out the present invention. The motor drive aspects of the present invention may be better understood by reference to the simplified diagram of FIG. 4 in which the GSP chip is replaced with a generic CPU 51 and motor M drives the wheel/tire assembly through a 5.37:1 belt drive 53. Also indicated in FIG. 4 is a 30 Hz watchdog pulse supplied on a set of control lines 55 to motor control drive 27. In addition, control line set 55 includes a digital signal of software settable duty cycle which is interpreted by the motor drive as a linear function of desired "torque." In other implementations of this invention, it is also possible to achieve this function using a varying analog level, a frequency modulated digital signal, and other such approaches, depending on the drive input requirements. The third control line to the motor drive is a drive enable line.

Figure 5:
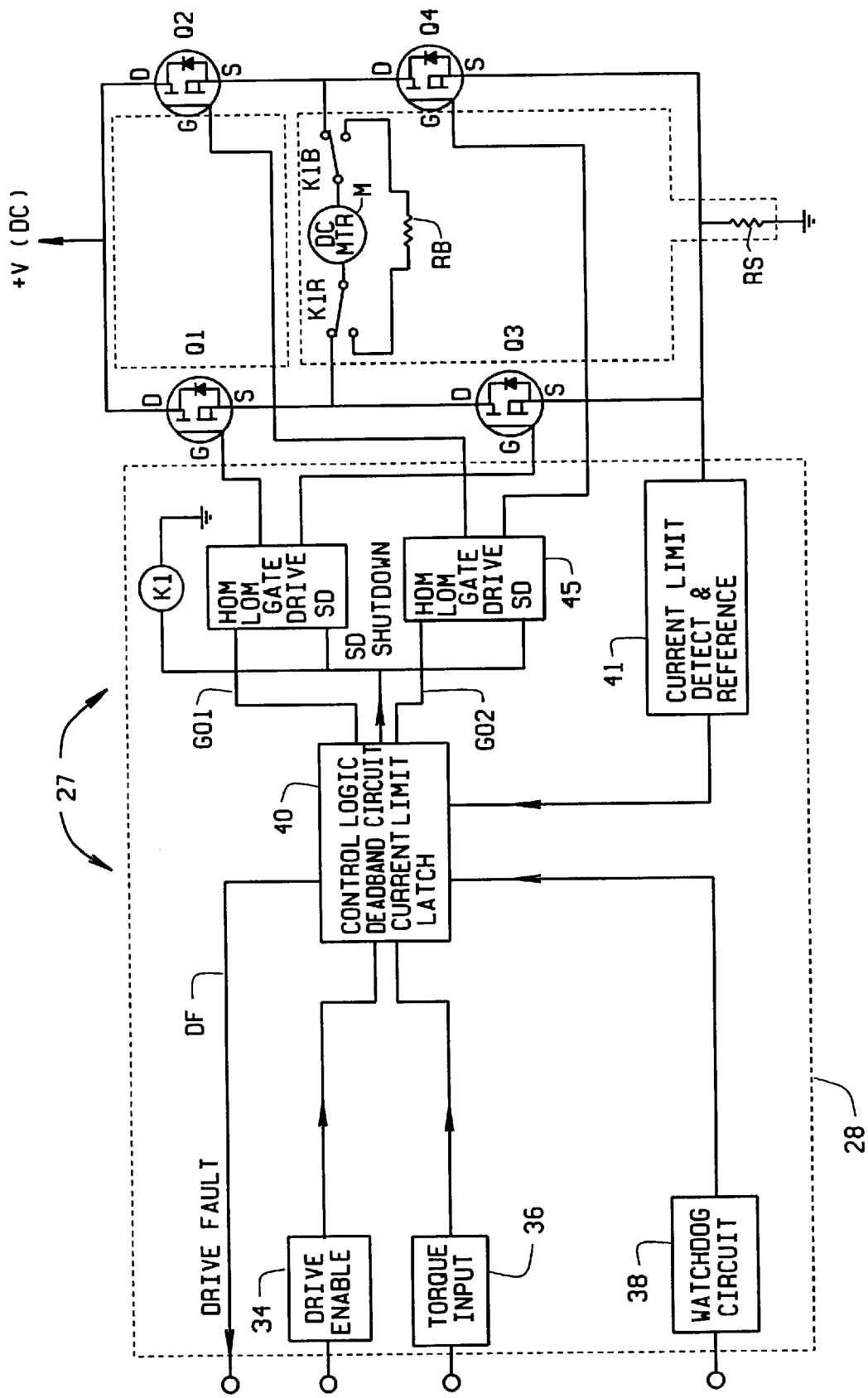
FIG. 5 is a block diagram of motor control circuitry of the balancer of the present invention.

The motor control drive 27 is illustrated in FIG. 5. Drive circuit 27 has four drive transistors Q1, Q2, Q3 and Q4 connected as shown to provide direct current to the windings of direct current motor M selectively with each polarity. Specifically, transistor Q1 is connected to supply current from a dc rectified source to one side of the windings of the motor. When current is supplied through transistor Q1 to the windings, the circuit is completed through the windings and transistor Q4 (and a current sensing resistor RS) to ground. This causes the windings of motor M to be energized so as to cause rotation of the balancer shaft in a first rotational direction. Similarly, when transistors Q1 and Q4 are rendered non-conductive and transistors Q2 and Q3 conduct, the windings are energized in the opposite polarity. It is preferred that the direction of rotation of motor M be controlled by pulse width modulating (PWM) current to the transistors. A duty cycle of 50% causes the current to flow through motor M in both directions in equal amounts. By the use of a suitably high pulse rate, the motor has insufficient time to respond to the rapidly reversing currents, with the result that the motor velocity is zero. As explained below, the dc motor actively holds the shaft at its present location. This provides, in effect, a "detent" function for the drive circuit 27.

A duty cycle of less than 50%, on the other hand, causes counterclockwise rotation of the motor shaft. As the duty cycle decreases from 50%, the counterclockwise torque becomes stronger and stronger. Similarly, a duty cycle of more than 50% causes clockwise rotation of the motor shaft. As the duty cycle increases above 50%, the clockwise torque in turn becomes stronger and stronger. A 0% duty cycle results in maximum torque counterclockwise, while a 100% duty cycle results in maximum torque clockwise.

It is preferred that transistors Q1–Q4 be insulated gate bipolar transistors (IGBTs) such as those sold by International Rectifier under the trade designation IRGPC40KD2. Other similar transistors, or transistors having similar characteristics such as MOSFETS, could also be used.

If it is desired to use an AC motor, the drive system would preferably be some type of AC vector drive, although such drives are at present significantly more expensive.

Whatever drive system is used, it preferably has interface circuits 34, 36, and 38 for the drive enable, "torque" input, and watchdog inputs respectively from the CPU. These signals are supplied to a control logic circuit 40 which performs necessary logic functions, as well as conventional deadband, and current limit functions. Circuits to perform the functions of circuit 40 are well known. The current limit function of circuit 40 depends upon the current measured by current sense resistor RS, the voltage across which is detected by a current limit detection and reference circuit 41.

Circuit 40 has four outputs. The first, a drive fault line DF, is used to signal the CPU chip that a drive fault has occurred. The second and third, labeled GD1 and GD2, supply PWM control signals to the actual gate drive circuits 43 and 45, circuit 43 being connected to the gates of transistors Q1 and Q3, and circuit 45 being connected to the gates of transistors Q2 and Q4. The fourth output of circuit 40, labeled SD, allows circuit 40 to provide a shutdown signal to gate drive circuits 43 and 45. In addition, the shutdown signal is supplied to a transistor Q5 (FIG. 7A) whose drain is connected to braking resistor RB. When the shutdown signal occurs, the drive transistors Q1 Q4 turn off and the braking resistor gets shorted between the 390 VDC bus and ground. This provides braking for the motor during a shutdown condition.

Figure 6:
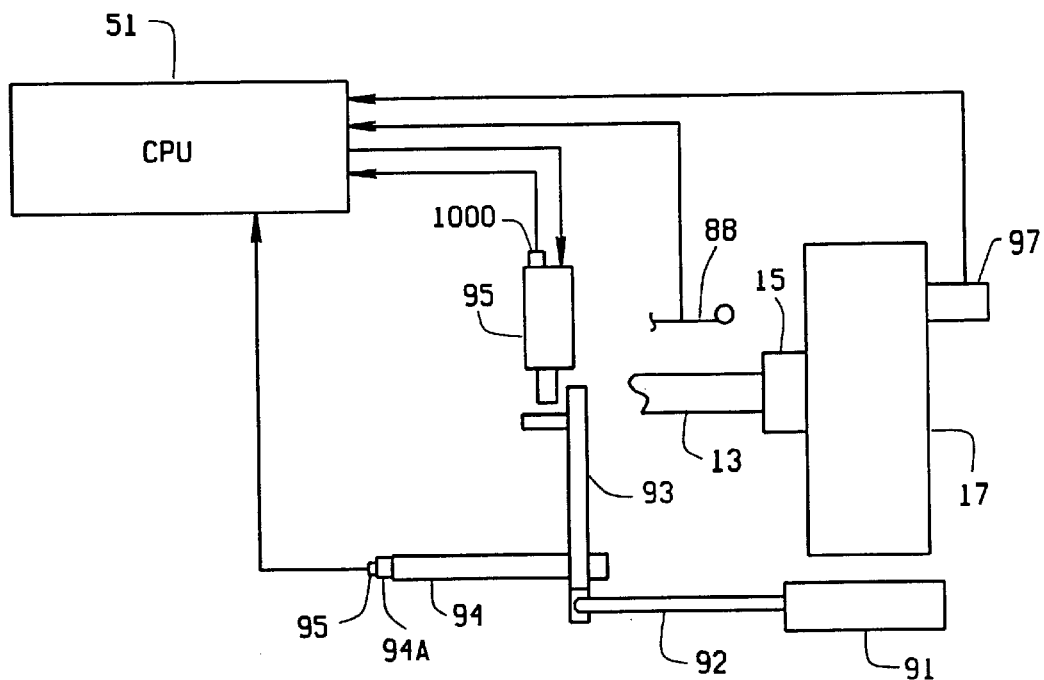
FIG. 6 is a simplified block plan view illustrating the use of the balancer of the present invention with a load roller and various measuring devices.

To understand the improvements of the present invention, it is helpful to examine some terms. FIG. 6 shows a tire 17 with a load roller 91 pressing against it, along with the three contact forces which are defined as radial, lateral and tractive. Tire uniformity is a term which refers to a condition in which some property of a tire is not symmetric about its rotational axis. There are many uniformity parameters which can be quantified.

The root-mean-square value of radial force variation is a good uniformity parameter to use, as shown in U.S. Pat. No. 4,702,103, because it is representative of the power produced by the tire rotating on the vehicle as a result of force variations in the vertical direction.

A value for the tire stiffness is required to convert rim runout into radial force variation due to rim runout: (rim runout)(tire stiffness)=radial force variation due to rim runout. Loaded radial runout of the wheel tire assembly can also be converted to a force variation value by using the tire stiffness or it can be measured directly as will be shown later. By subtracting the rim force variation from the wheel/rim assembly force variation, the tire force variation can be obtained. By shifting the angle of the tire force variation relative to the rim force variation, the root-mean-square value of wheel/tire assembly force variation can be computed at many remount angles of tire to rim. Selecting the remount angle with the lowest wheel/tire assembly radial force variation is then possible.

The first harmonic of radial force variation is believed to be the best uniformity parameter to use to minimize wheel vibration because it also helps minimize the first harmonic tractive force variation. U.S. Pat. No. 4,815,004 shows how tractive force variation can be determined based on wheel properties and rotational speed squared. Taking equation (17) in U.S. Pat. No. 4,815,004 and applying it to a vehicle moving on a flat road at constant speed, one finds:

$$F_T = \frac{I\omega^2}{r} \sum_{i=1}^{\infty} iU_i \cos(i\omega t + \phi_i)$$

where $F_t$ is the tractive force on the tire, I is the polar moment of inertia of the wheel/tire assembly and vehicle hub, $\omega$ is the angular velocity of the wheel, r is the outer radius of the tire, $U_i$ is the ith Fourier coefficient of the change in effective radius per revolution of the tire, t is elapsed time, and $\phi$ is the phase shift of the ith harmonic. This equation may be used to calculate the radial and tractive force variations on a wheel with typical properties as illustrated by the following example:

Wheel/tire assembly is perfectly uniform except for 0.005" radial mounting offset on the vehicle hub Wheel assembly weight=35 lb.

O.D. of wheel=24 inches

Polar moment of inertia of the wheel/tire assembly and vehicle hub=0.7 slug ft$^2$ Vehicle speed=75 mph, which means the wheel rotational speed is 110 radians/second Tire stiffness is 1200 lb/inch Peak to Peak Radial force variation=(0.005")(1200 lb/in)(2)=12.0 lb Peak to Peak Tractive force variation=((0.7 slug ft$^2$)(110$^2$)(radian/sec)$^2$/1 ft)* (0.005/12 ft)(2)=7.1 lb Note: 90 degrees of wheel rotation occurs between peak radial and tractive forces. The combination of radial and tractive forces, therefore, is equivalent to a force vector which rotates with the tire. It is believed that the relationship between wheel/tire assembly radial and tractive force variations caused by factors other than mounting offset used in this example is similar.

Turning to FIG. 6, there is shown a load roller 91 suitably disposed adjacent wheel/tire assembly 17 so that it may be forced into engagement with the tire so as to measure loaded runout of the assembly. More specifically, load roller 91 is carried on a shaft 92 suitably journaled on an L-shaped arm 93 (only the lower limb of which is clearly visible in FIG. 7) designed to pivot about the axis of a shaft 94. CPU 51 causes the arm to pivot to place load roller into engagement with the tire by actuating an air cylinder 95 or an air bag actuator. Air pressure to cylinder 95 can be variably adjusted by CPU control. Air pressure feedback is provided by a sensor 102 such as those sold under the trade designation MPX 5700D by Motorola Inc. The feedback enables precise load roller forces to be generated and provides a unique safety feature in that the CPU can detect pressure problems and remove air pressure if needed. Rotation of shaft 94 (specifically rotation of a magnet 94A mounted on shaft 94) is sensed by a sensor 96 such as a Hall-effect sensor such as those sold under the trade designation 3506, 3507 or 3508 by Allegro Microsystems Inc. and the amount of rotation is signaled to the CPU.

By applying a known force to the tire with the load roller and watching the output of sensor 96, the CPU can determine the loaded runout of the wheel/tire assembly. Specifically, CPU 51 uses the output of sensor 96 to measure the runout of wheel/tire assembly 17 under the predetermined load. To determine imbalance weight amounts which are required to counteract the forces due to runout of the wheel, the CPU also needs tire stiffness information. Stiffness information can be downloaded directly from another measuring device such as a shock tester (not shown), or can be manually input using the manual input device 29, or can be recalled from a stored database. Alternatively, the CPU can determine tire stiffness directly by sequentially applying at least two different loads to load roller 91 and measuring the change in deflection. The amount of additional correction weight needed to counteract the forces due to the loaded runout is found by the following formula:

$$\text{correction mass} = \frac{\text{loaded runout first harmonic} * \text{tire stiffness} * \% \text{ radial force for counteract}}{(\text{radius to place correction weight}) * (\text{rotational speed})^2}$$

With the additional mechanisms of FIG. 6, it is possible to further improve the balancing of the wheel/tire assembly. For example, by manually inputting the load range of the tire under test, the operator can cause CPU 51 to adjust the force on load roller 91 to a value which will make the loaded runout measurement most closely agree with the vibration of the wheel when it is mounted on the vehicle. Moreover, the speed at which the vibration is to be minimized may also be inputted to CPU 51 so that imbalance correction may be optimized for this parameter as well. Generally, that speed would be selected to be at or slightly above the wheel hop resonant frequency. This speed also should be close enough to the maximum operating speed to prevent excessive correction at the maximum speed. The amount of this correction also should have a maximum limit of 0.5 oz.

In addition, CPU 51 is preferably connected to suitable sensors 88 and 97 for measuring the axial and radial runout of the inside and outside rims of assembly 17 at the bead seats. Various sensors suitable for the task are known. These outputs are radial and axial rim runout signals. The first harmonic of radial rim runout (both angle and magnitude) is determined by CPU 51 using a suitable procedure such as digital filtering or discrete Fourier transform (DFT). The same process can be performed to determine axial runout for each rim. With both tire and rim roundness measurements, CPU 51 is able to compare the measured values with stored rim and tire runout specifications. When those specifications are not met, it is a simple calculation to determine a remounted orientation of the tire on the rim, which minimizes the total loaded runout. CPU 51 causes the display of such an orientation on display 25, along with the residual loaded runout which would remain after remounting. Alternatively, this information may be used to calculate the positions and amounts of required tire grinding to correct the loaded runout.

Since the present motor control circuitry is capable of rotating the balancer shaft at any speed, it may, if desired, slowly rotate the wheel/tire assembly while the various runout measurements are being taken. If desired, such measurements may be taken over two or more revolutions of the wheel/tire assembly, and the results averaged. If measurements over different revolutions differ by more than a preset amount, CPU 51 is preferably programmed to take additional measurements.

Since the angular position of the wheel/tire assembly is directly controllable with the motor control circuitry of the present invention, after the minimized loaded runout position is calculated, CPU 51 may cause the assembly to slowly rotate to that position (putting that position on the tire at a predetermined position such as twelve o'clock, for example) and then hold that position. If a tire bead breaker is integrated with the balancer, motor M can index the rim while the tire is held stationary by the bead breaker, eliminating many steps of current matching procedures involving a separate tire changer.

Instead of measuring deflection of the load roller 91 as described above, alternatively CPU 51 can use the balancer force transducers 19 and 21 to measure the load applied by a rigidly mounted roller. Roller 91 can be rigidly mounted, for example, by loading it with a desired force from an air cylinder and then locking it into place with a pawl or using an electric motor with lead screw and nut. This measurement (known as radial force variation) can be used to determine what correction weights are needed to cancel out the vibrations due to this wheel assembly non-uniformity. Note that tire stiffness is not required to find the correction weights needed to counteract the wheel's radial force variation. Using this system, the $$\text{correction mass} = \frac{\text{first harmonic of radial force variation}}{(\text{radius to place correction weight}) * (\text{rotational speed})^2}$$

If there is a difference in effective diameters in two wheels mounted on the front of a front wheel drive vehicle, there will be a tendency for the vehicle to steer away from a straight line when driven on a flat road. The effective diameter of a wheel/tire assembly is the distance a vehicle will advance in a straight line on a flat road when the wheel/tire assembly rotates exactly one revolution, divided by the value of π. Differences in effective diameter as small as 0.013 inches have caused noticeable steering problems. The output of sensor 96 show in FIG. 7, which measures the rotational position of the load roller arm, can be used to determine a value related to the effective diameter of the wheel/tire assembly. An alternate method to determine the effective diameter is by measuring the ratio of the angular rotation of the load roller and the angular rotation of the wheel/tire assembly and then multiplying this ratio times the diameter of the load roller. Displaying a message to the operator pertaining to effective diameters (or differences in diameters) of the wheel/tire assemblies and to stored specifications is useful.

Different vehicles are sensitive to non-uniformity in wheel/tire assemblies at different levels. For example, a medium duty truck with a first harmonic radial force variation of 50 lb. will not be likely to receive ride quality complaints while the same value of first harmonic radial force variation on a small automobile is very likely to produce an objectionable ride. By providing means for the operator to input the vehicle model or the class of vehicle on which the wheel/tire assembly is to be mounted, and by having stored uniformity specifications contained in the balancer's control circuit, it is possible for the balancer to compare the measured wheel/tire assembly's uniformity parameters to the specifications and send a message to the operator when the wheel/tire assembly is outside of specification. A very complete listing of hundreds of vehicle models and optional equipment packages could be used, or a very simple class system with as few as two classes (such as car vs. truck) could be used to apply stored specifications. The use of these specifications can help the operator spend time where it is useful and avoid wasting time and effort when the specifications show that a large value of a uniformity parameter is acceptable.

After measurements and computations have been made to determine the values of various uniformity parameters, this information can be displayed to the operator.

Immediately after a tire is mounted to a rim, the tire bead is not always firmly located against the rim bead seat. This can result in errors in imbalance measurements. An important benefit of the load roller is that it strains the tire and causes the tire bead to seat firmly before balancing. Additionally, the load roller provides a break-in of the tire carcass (reducing or eliminating non-uniformities due to initial construction of the tire or from the tire being deformed during shipping and storage).

Although automatic movement to a calculated rotational position is described above in connection with loaded runout, it should be understood that the present balancer is capable of such automatic movement to any calculated position, such as correction weight application points other than the standard 12:00 o'clock position. For example, to mount an adhesive backed weight, the CPU causes the motor to rotate the wheel/tire assembly so that the correction weight position matches the 6:00 position so that the operator can more easily apply the weight. The particular type of weight(s) being used are manually input using device 29 so that the CPU can perform the proper calculation of correction weight position. In addition, a desired wheel/tire assembly rotational position may be manually requested by manual input device 29. Alternatively, an operator may manually move the wheel/tire assembly from one position at which the motor is holding the assembly to another. CPU 51 is programmed to cease holding at any given position once an angular force greater than a predetermined threshold force is applied to the assembly, such as by the operator pushing the tire. The magnitude of such a force is sensed indirectly by the CPU 51 by examining the amount of current required to overcome the applied force and hold the wheel/tire assembly in place. Once the manual movement of the assembly stops, CPU 51 controls motor M to rotate the wheel to the other balance plane weight location and hold the assembly in the new position.

CPU 51 also controls the torque applied by the motor indirectly. The EEPROM has stored the current vs. torque characteristics of the motor M and uses those characteristics to determine the actual torque applied. This actual torque is compared to the desired torque for any particular application, several of which are described below. A simple example is the application of relatively low torque at the start of the spin, which prevents jerking of the wheel by the balancer, followed by relatively higher torque to accelerate the tire to measurement speed as quickly as possible.

Slow rotation of the wheel/tire assembly is useful in several situations. For example, in measuring rim runout (whether loaded or unloaded) CPU 51 can rotate the assembly 17 at a controlled slow speed (1 Hz or so). This frees both of the operator's hands so that left and right rim runout may be measured simultaneously. Slow rotation is also useful in tightening wing nut 101 (FIG. 2) onto shaft 13. In this mode of operation CPU 51 causes the shaft to rotate at about 2 Hz while the operator holds wing nut 101 in place. This provides a quick spin-on of the wing nut. Rotation continues until the current draw indicates resistance against further movement. Alternatively, the CPU may examine the current vs. torque characteristics of the motor to allow the operator to continue tightening the wing nut until a desired preset torque is reached. In yet another mode, the shaft rotates at an even slower speed (½ Hz or so) while the operator tightens the wing nut. This allows the wheel to "roll" up the cone taper, instead of being shoved sideways up the taper, resulting in better wheel centering on the cone.

Although the present motor control is capable of very slow rotation and fast rotation for measurement, intermediate speeds for imbalance measurement are also achievable and useful. For example, a large tire (as measured by sensor 96 or as indicated by a manual input from device 29) may be rotated at a speed which is somewhat slower than that used for smaller tires. This shortens total cycle time and also allows the rotary inertia of big tires to be kept below predefined safety limits (which feature is especially useful with low speed balancing with no wheel cover). Similarly, a tire with a large imbalance may be tested at a slower speed than usual to keep the outputs of sensors 19 and 21 within measurable range. This prevents analog clipping of the sensor signals and permits accurate imbalance measurements to be taken under extreme imbalance conditions. In addition, large tires may be rotated at a slower rotary speed than smaller tires to achieve the same linear speed (MPH) for those operators who desire to test wheel imbalance at speeds corresponding as much as possible to highway speeds or a "problem" speed.

Since the speed of rotation can be accurately controlled with the present invention, it is desirable to perform a calibration run on the balancer in which the balancer is automatically sequenced through a multitude of speeds. If balancer resonant vibrations are detected by CPU 51 at any of those speeds, CPU 51 stores those resonant speeds in memory and avoids those resonant speeds in subsequent measurement operations on a wheel/tire assembly. The magnitude of signal from an imbalance force sensor normally increases nearly proportionally to the square of the rotational speed. The angular relationship of the signal to the balancer spindle normally does not change significantly with rotational speed. Any deviation from this signal/frequency relationship can be detected as a resonance.

In a similar manner, the balancer can detect that an imbalance measurement of a wheel is invalid by comparing each revolution's sensor reading and if the magnitude or angle changes beyond preset limits then the measurement is considered "bad" and the CPU changes the speed of rotation until a good reading can be obtained.

Inasmuch as the present invention permits the wheel/tire assembly to be rotated in either direction, the present balancer may be used to rotate in either direction, as selected by the operator. In addition, if desired, the assembly may be rotated in a first direction for measurement of imbalance and in the opposite direction during the check spin after correction weight(s) are applied.

Figure 7:
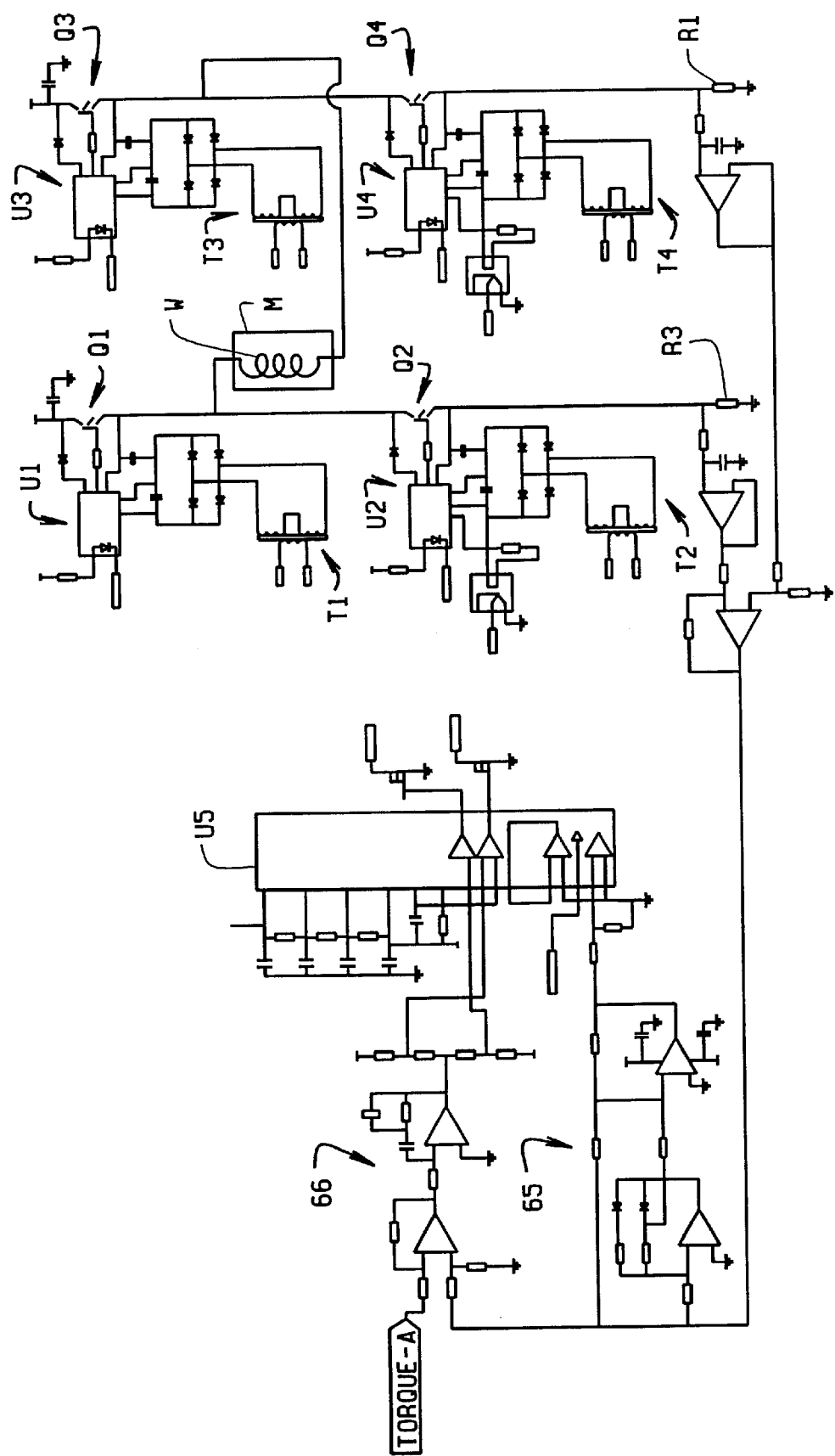
FIG. 7 is a schematic circuit diagram of the drive circuitry used in the present invention.

The motor control drive is illustrated in more detail in FIG. 7. The drive circuit has four drive transistors Q1, Q2, Q3 and Q4 connected as shown to provide direct current to the windings W of motor M selectively with each polarity. Specifically, transistor Q1 is connected to supply current from a 390VDC source to one side of the windings of the motor. When current is supplied through transistor Q1 to the windings, the circuit is completed through the windings and transistor Q4 to ground. This causes motor M to drive the balancer shaft in a first rotational direction. When rotation in the opposite direction is required, transistors Q1 and Q4 are rendered non-conductive and transistors Q2 and Q3 conduct. This causes current from the 390VDC source to flow through Q3 and through windings W in the opposite direction. The circuit is completed through transistor Q2 to ground. This causes rotation of the balancer shaft in the opposite direction.

It is preferred that transistors Q1–Q4 be insulated gate bipolar transistors (IGBTs) such as those sold by International Rectifier under the trade designation IRGPC40KD2. Other similar transistors, or transistors having similar characteristics such as MOSFETS, could also be used.

The control signals for transistors Q1–Q4 comes from the gate and emitter outputs of corresponding gate and emitter outputs of driver chips U1–U4, which are preferably Fuji EXB-840 type hybrid circuits. The outputs of chips U1 and U2 are always complementary, as are those of U3 and U4, so as to energize the drive transistors Q1–Q4 as described above. This is accomplished through common drive signals PHASE1 and PHASE2 applied to the driver chips. These drive signals are generated by a PWM generator U5 under the control of the CPU 23, which thereby controls the direction of current through motor M (and hence the direction of rotation of the shaft), as described above. Each driver has its own power source derived from square wave signals DRV1 and DRV2 applied to corresponding transformers T1–T4 associated with each driver chip.

Referring to the bottom portion of FIG. 7, it can be seen that the motor winding current in every case flows through a sensing resistor R1 or a sensing resistor R3. This current is supplied to a comparator and filtering circuit 65 composed of four op amps U11 configured with passive devices to provide warning signals when the current through resistor R1 exceeds a preset amount (such as 8 amps). When a warning signal occurs, the drive signals (labeled Phase1 and Phase2) all go low, thereby shutting off the flow of current through the motor windings. The PWM generator also receives a TORQUE-A signal and a SHUT DOWN signal, both of which are described below. More specifically, the TORQUE-A signal and a signal representing motor current are supplied to an op-amp network 66 whose output is supplied to the PWM generator. During normal operation, the output of network 66 controls the duty cycle of PWM generator U5 as commanded by the CPU 23 to control operation of the motor as described above. The SHUT DOWN signal is used to shut down the motor during an abnormal situation.

Figure 7A:
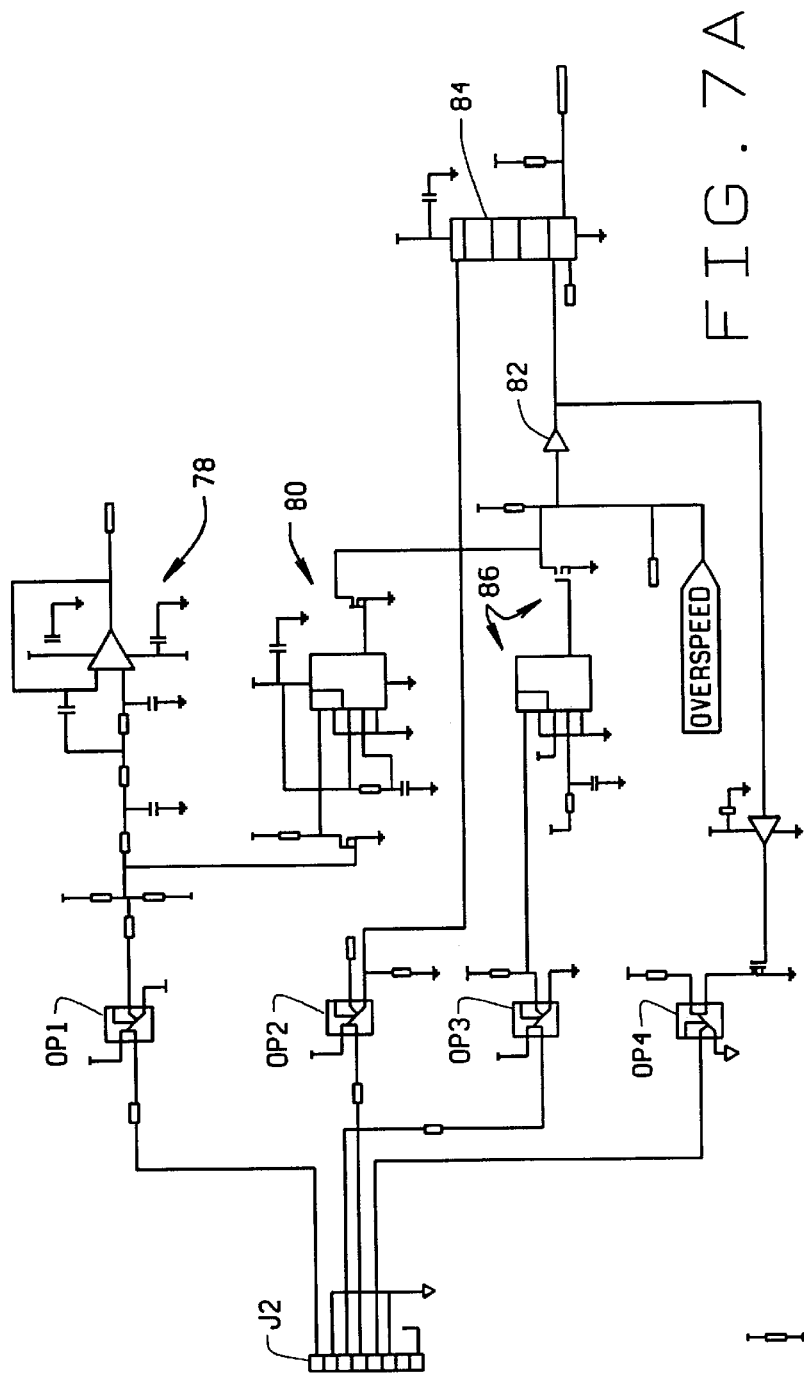
FIG. 7A is a schematic circuit diagram of control signal circuitry used in the present invention.

The SHUT DOWN signal is generated in the circuitry of FIG. 7A. FIG. 7A shows a plug J2 attached to the CPU 23 (the CPU is not shown in FIG. 7A) which supplies the desired torque information, and the watchdog and enable pulses, from the CPU to the circuitry of FIG. 7A. The plug also passes back to the CPU a fault signal. The desired torque watchdog and enable signals are passed through optical isolators OP1–OP3 to the remaining circuitry. In similar fashion, the fault signal is optically isolated by unit OP4.

The desired torque signal is converted by a circuit 78 to analog form, with the corresponding analog signal being labeled TORQUE. The desired torque signal is also supplied to a multivibrator circuit 80, whose output is an indication of whether or not the desired torque signal is being received from the CPU. This is ORed with other signals, and supplied through an inverter 82 to a flip-flop 84, whose output is the SHUT DOWN output. The enable signal is supplied directly from isolator OP2 to the enable pin of flip-flop 84, so that when the enable signal from the CPU is missing, the SHUT DOWN signal is active.

The watchdog signal is supplied to a multivibrator circuit 86, whose output is also supplied through the inverter 82 to flip-flop 84. The final ORed input to the flip-flop is an OVERSPEED signal, described below. As can be seen, when any of the control signals indicate a problem, the SHUT DOWN signal represents that fact. This signal is supplied directly to the PWM generator U5 (FIG. 7) to shut down the motor.

Figure 8:
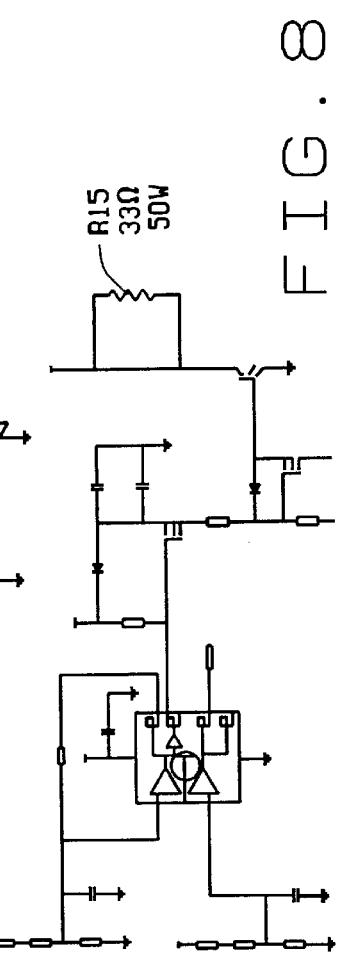
FIG. 8 is a schematic circuit diagram of electrical braking circuitry used in the present invention.

Turning to FIG. 8, there is shown an alternative circuit for providing a dynamic braking function. Specifically, if power is removed from balancer 11 during operation, the dc motor M functions as a generator so long as the wheel/tire assembly continues rotating. This keeps the dc bus alive during the dynamic braking process. The braking circuit includes a 33 ohm, 50 watt resistor R15 connected between the 390-volt source and a transistor Q9. When the transistor conducts, resistor R15 serves to dissipate the energy in the rotating motor, bringing it to a halt. Transistor Q9 conducts when the back emf of the motor rises above a threshold. This can occur during two situations: normal motor deceleration and power loss. The motor is normally decelerated by applying a reverse torque to the motor using the H-bridge described above. This causes the back emf to rise. During deceleration, the transistor Q9 is pulsed to keep the bus at a nominal level during reverse torque braking. During power loss, the transistor is held full-on, thereby providing electric braking.

Figure 9:
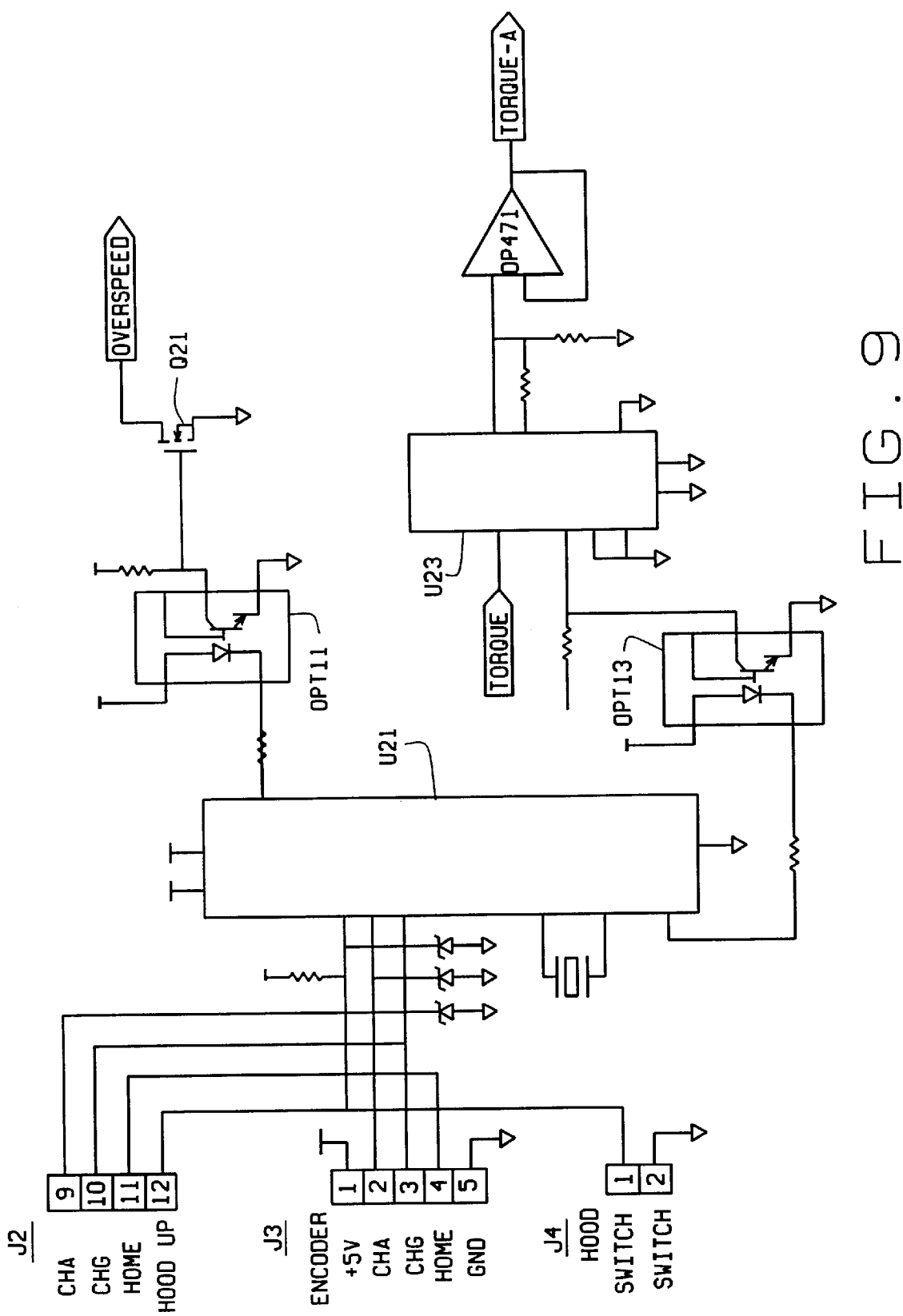
FIG. 9 is a schematic circuit diagram of a hardware safety interlock circuit used in the present invention.

FIG. 9 illustrates a hardware safety interlock circuit of the present invention. In this circuit, various signals (such as hood open signals, and rotation rate signals (labeled CHA and CHB)) are supplied to an independent 8051-type processor U21. When the encoder signal represent a rotational speed above a preset limit (such as 20 to 30 rpm) and the hood is open, chip U21 provides an overspeed signal through an opto-coupler OPT11 and a transistor Q21 to the connection labeled OVERSPEED on FIG. 9. This, as described above, is used to shut down the motor by controlling the operation of PVM generator U5.

Similarly, when the inputs indicate an excessive torque situation (e.g., over 2–3 ft-lbs.) when the hood is open, chip U21 signals this condition through an opto-coupler OPT13 which controls the output of a 4053-type 1-of-2 switch U23. Switch U23 also provides the regular "Torque" signal (described above in connection with FIG. 7A) to the rest of the control circuitry when the hood is down. When the hood is up, switch U23 connects the TORQUE input to a ⅓ voltage divider, which thereupon supplies a signal through a voltage follower to the TORQUE-A output, which is supplied (FIG. 7) to the drive circuit to limit the torque to a preset amount (2–3 ft-lbs.). When the hood is down, the TORQUE input is supplied directly through the voltage follower.

Figure 10:
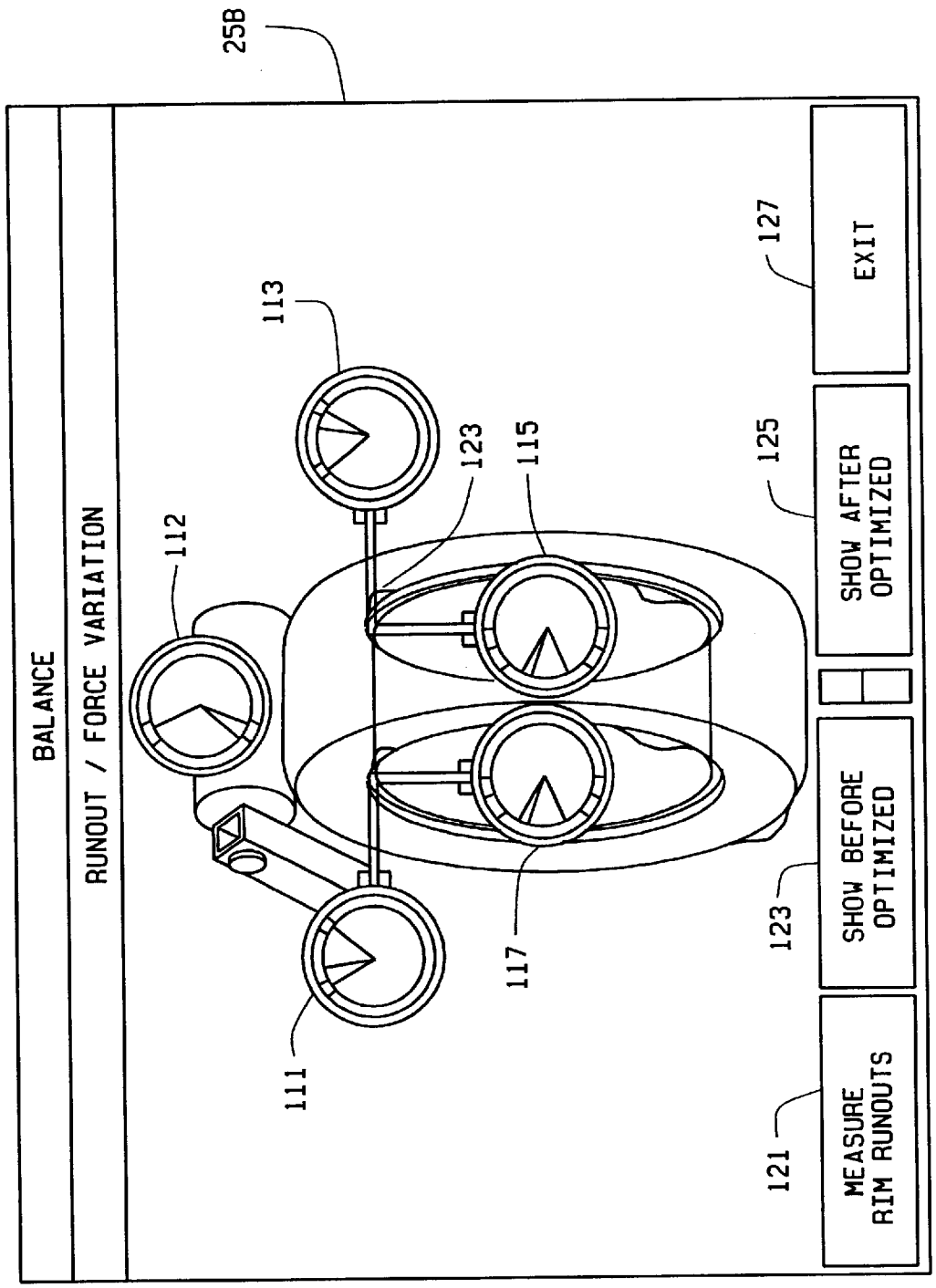

Turning to FIG. 10, there is shown an improved display 25B of the present invention. As described above, the present balancer can acquire the loaded runout, axial runouts and radial runouts of the wheel/tire assembly. These are displayed in connection a three-dimensional representation of the wheel/tire assembly. Specifically, the display of FIG. 10 represents an example of the runout display after the spin has determined loaded runout and after the runout arms 88 and 97 have been used and retracted. The CPU translates the runouts and force variations obtained at the devices' particular contact points to 12:00 position runouts, and displays the acquired runouts with respect to the instantaneous position of the main shaft encoder as if the user had taken the time and expense to place runout gauges on the physical wheel.

The display of FIG. 10 shows the total indicated readings of runout (by means of the numerals on the displayed needle gauges 111, 113, 115, 117), any bad total readings (by highlighting the corresponding numerals in a contrasting color), and the graphical range of the runout readings (by providing a lighter colored pie section in each needle gauge representation corresponding to the measured variation in runout). This latter feature allows the user to tell at a glance the total travel the needle of each gauge would have without rotating the wheel at all. It is preferred that the gauge representations have green, yellow and red color bands, which are automatically scaled per the sensitivity of that particular reading for that particular type of vehicle.

Note that the display includes bumps on the rim and tire. These represent the relative magnitudes and locations of the measured runouts. These features move around the axis of the displayed wheel as the actual wheel is moved. The display also includes a representation 121 of the position of the valve stem on the display. This position is acquired by the system via encoder 15. For example, the user can be instructed to start the measurements with the rotational position of the valve stem at the 12:00 o'clock position.

In the display of FIG. 10, the loaded runout "high spot" is nearly opposite the rim high spots, as can be seen readily from the display. This means that matching of the tire to the rim by removing the tire and repositioning it could greatly reduce or even eliminate total runout. The system is programmed to respond to the "Show after Optimized" switch 125 to illustrate the various runouts that would result if this matching were performed, thereby informing the user if the procedure would be worthwhile.

The various key displays on FIG. 10 (Show After Optimized key 125, Exit key 127, Measure Rim Runouts 129, and Show Before Optimized key 131) can be replaced by the key displays shown in FIG. 10A to allow the user to request additional functions as indicated by those displays. The show T.I.R. Readings (total indicated readings) is the default. Alternatively, live readings as obtained from the data acquisition system may be displayed, as may be the tolerance values for the total indicated readings for the measurement for the selected vehicle. The Rotate to Next Position key can be used to signal the motor to position and hold the wheel/tire assembly at the various high spots for the purpose of applying indicator marks to the assembly.

If sensor 88 or 97 is pulled away from its home position while the runout screen of FIG. 10 is displayed, the balancer turns that sensor into a virtual dial indicator. By placing the sensor against the rim, a key (not shown) can be pressed to zero the corresponding gauge display, just like a real dial indicator. Then, as the wheel/tire assembly is turned, the gauge display shows the runout as it is measured, just like a real dial indicator.

Turning to FIG. 11, there is shown a display of the present balancer which allows the user/operator to manually set the desired speed at which the balancing is to occur. This feature is useful, for example, when the vehicle owner complains of a vibration at a particular speed, such as 30 mph. To test the balance of the wheel/tire assembly at 30 mph, the operator presses soft key 141, labeled "Velocity Mode", which causes the display of the simulation of a vehicle dashboard 143 as shown in FIG. 11. The operator can use a soft key 145 to select either the linear speed (e.g., the complained of 30 mph) or the actual rotational speed in revolutions per minute by toggling key 145. Soft keys 147, 149 can then be used to set the linear speed or rpm as desired. As the selected speed is changed, the dashboard display changes accordingly. Once the desired speed is reached on the display, the operator uses another soft key (not shown) to initiate the actual balancing procedure. As the balancer starts accelerating the wheel/tire assembly, preferably the dashboard display shows the corresponding vehicle speed, so that the operator (and customer) can verify that the balance is tested at the desired speed.

In the event the operator selects a linear speed, the CPU 23 converts the selected linear speed to the corresponding revolutions per minute for that particular wheel/tire assembly. Whether linear speed or rpm is selected, CPU 23 is responsive thereto to cause the motor to rotate the wheel/tire assembly at the desired speed. In this way, the operator can input a desired speed and balancer tests the wheel/tire assembly at that speed.

A knob 159 is disposed adjacent display 25. Knob 159 is used to enter a desired force to be applied to the wheel/tire assembly by load roller 91 during the balancing procedure. For example, the operator may wish to test the wheel/tire assembly under normal operating conditions, which would involve applying a force which corresponds to the weight normally applied to that particular wheel for that particular vehicle. To do this the knob is turned as needed to change the numerals 161 displayed adjacent knob 159 until they reach the desired value. Alternatively, if the vehicle type has already been entered into the system, the CPU 23 can preset the load to be applied once the axle on which the wheel/tire assembly is to be mounted is identified.

In view of the above, it will be seen that all the objects and features of the present invention are achieved, and other advantageous results obtained. The description of the invention contained herein is illustrative only, and is not intended in a limiting sense.

We claim:
1. A wheel balancer comprising:
   a shaft adapted for receiving a wheel/tire assembly, said shaft having a longitudinal axis and being rotatable about said axis so as to rotate a wheel/tire assembly removably mounted thereon;
   a rotation sensor for measuring rotation of the shaft about said longitudinal axis;

a vibration sensor operatively connected to the shaft for measuring vibrations resulting from imbalance in the wheel/tire assembly;

a motor operatively connected to the shaft for rotating said shaft about said longitudinal axis, thereby to rotate the wheel/tire assembly; and a control circuit for controlling an application of current to the motor to rotate the wheel/tire assembly at a plurality of sustained speeds.

2. The wheel balancer as set forth in claim 1 wherein the control circuit is responsive to a wheel/tire assembly having a parameter greater than a predetermined threshold, to cause the wheel/tire assembly to rotate at a first sustained speed and causing wheel/tire assemblies which do not exceed the predetermined threshold to rotate at a second sustained speed, the first speed being slower than the second speed.

3. The wheel balancer as set forth in claim 2 wherein the parameter is wheel size, said wheel size being manually inputted.

4. The wheel balancer as set forth in claim 2 wherein the parameter is wheel inertia.

5. The wheel balancer as set forth in claim 1 wherein the control circuit is responsive to the vibration sensor to determine the imbalance of the wheel/tire assembly, said control circuit being further responsive to vibration greater than a predetermined vibration to cause the wheel/tire assembly to rotate at a speed slower than a preset, standard speed of rotation.

6. The wheel balancer as set forth in claim 1 including a manual input signal representing a desired speed of rotation, said control circuit being responsive thereto to cause the wheel/tire assembly to rotate at said desired speed of rotation.

7. The wheel balancer as set forth in claim 6 wherein the balancer includes a measuring device for measuring an outer diameter of the wheel/tire assembly and the desired speed of rotation is expressed in units of linear velocity, the control circuit being responsive to the measured diameter of the wheel/tire assembly to convert the linear velocity to the corresponding speed of rotation for the wheel/tire assembly.

8. The wheel balancer as set forth in claim 1 wherein said control circuit has a calibration mode in which the control circuit controls the motor to rotate the shaft at a variety of sustained speeds without a wheel/tire assembly mounted thereon to detect resonances of the balancer.

9. The wheel balancer as set forth in claim 1 wherein said control circuit is responsive to signals from the vibration sensor indicative of a possible resonance condition to select a sustained speed of rotation of the wheel/tire assembly which differs from the speed of rotation at which the resonance indicative signals were obtained.

10. The wheel balancer as set forth in claim 9 wherein the possible resonance condition indicating signals are obtained with a wheel/tire assembly mounted on the balancer.

11. The wheel balancer as set forth in claim 1 further including at least one input device for providing speed selection signals to the control circuit, the control circuit being responsive to at least one speed selection signal to cause the wheel/tire assembly to rotate at a sustained speed lower than the maximum speed of the motor.

12. The wheel balancer as set forth in claim 11 further including a hood having an operational position covering a portion of the wheel/tire assembly during rotation and having a second position in which the hood does not cover the wheel/tire assembly, wherein said input device includes a sensor for sensing the position of the hood, said control circuit being responsive to the hood being in the second position to cause the wheel/tire assembly to rotate at a relatively low speed and at relatively low torque.

13. A wheel balancer comprising:

a shaft adapted for receiving a wheel/tire assembly, said shaft having a longitudinal axis and being rotatable about said axis so as to rotate the wheel/tire assembly removably mounted thereon;

a rotation sensor for measuring rotation of the shaft about said longitudinal axis;

a vibration sensor operatively connected to the shaft for measuring vibrations resulting from imbalance in the wheel/tire assembly;

a motor operatively connected to the shaft for rotating said shaft about said longitudinal axis, thereby to rotate the wheel/tire assembly;

a control circuit for controlling the application of current to the motor and for determining from vibrations measured by the vibration sensor at least one weight placement position on the wheel/tire assembly to correct said vibrations;

a manually operable input device to set desired sustained speeds of rotation of the wheel/tire assembly so that a user can input a desired speed, said control circuit being responsive to the input device to cause the motor to rotate the wheel/tire assembly at the desired sustained speed, and the balancer tests the wheel/tire assembly at that speed.

14. The wheel balancer as set forth in claim 13 wherein the desired speed is in revolutions per unit time.

15. The wheel balancer as set forth in claim 13 wherein the desired speed is a linear velocity and the control circuit is responsive to the desired linear velocity to rotate the wheel/tire assembly at a rotational rate which corresponds to that linear velocity on the vehicle for the wheel/tire assembly under test.

16. The wheel balancer as set forth in claim 13 further including a display of the desired speed which includes a simulation of a dashboard of a vehicle.

* * * * *